US012000272B1

(12) United States Patent
Zhen et al.

(10) Patent No.: US 12,000,272 B1
(45) Date of Patent: Jun. 4, 2024

(54) GROUND TRANSMITTING SYSTEM AND METHOD FOR ELECTROMAGNETIC TRANSMISSION BETWEEN WELL AND GROUND FOR INTELLIGENT DRILL GUIDING

(71) Applicant: Institute of Geology and Geophysics, Chinese Academy of Sciences, Beijing (CN)

(72) Inventors: Qihui Zhen, Beijing (CN); Qingyun Di, Beijing (CN); Yuliang Wang, Beijing (CN); Quanmin Yang, Beijing (CN)

(73) Assignee: Institute of Geology and Geophysics, Chinese Academy of Sciences, Beijing (CN)

( * ) Notice: Subject to any disclaimer, the term of this patent is extended or adjusted under 35 U.S.C. 154(b) by 0 days.

(21) Appl. No.: 18/447,988

(22) Filed: Aug. 10, 2023

(30) Foreign Application Priority Data

Apr. 14, 2023   (CN) .......................... 202310397650.3

(51) Int. Cl.
  *E21B 47/13*     (2012.01)
  *G01V 3/30*      (2006.01)
(52) U.S. Cl.
  CPC ................ *E21B 47/13* (2020.05); *G01V 3/30* (2013.01)
(58) Field of Classification Search
  CPC . E21B 47/13; G01V 3/30; G01V 3/34; G01V 3/00; G01V 3/02; G01V 3/08;
  (Continued)

(56) References Cited

U.S. PATENT DOCUMENTS

| 5,428,267 A | 6/1995 | Peil |
| 5,625,539 A | 4/1997 | Nakata et al. |

(Continued)

FOREIGN PATENT DOCUMENTS

| CA | 2279539 | 10/1998 |
| CN | 102291011 | 12/2011 |

(Continued)

OTHER PUBLICATIONS

Zhenjun MA, et al., Analysis on equivalence effect of the grounded-wire transient electromagnetic method, Journal of Applied Geophysics 181 (2020) 104142.

(Continued)

*Primary Examiner* — Alvaro E Fortich
(74) *Attorney, Agent, or Firm* — Pilloff Passino & Cosenza LLP; Rachel K. Pilloff; Sean A. Passino

(57) ABSTRACT

A ground transmitting system and method for electromagnetic transmission between a well and a ground for intelligent drill guiding includes a well site power generation device, a ground transmitting device and current transmission ground electrodes. The well site power generation device, the ground transmitting device and the current transmission ground electrodes are connected in sequence. The well site power generation device is used for supplying power to the ground transmitting device. The ground transmitting device is used for sending generated current waveform to the current transmission ground electrodes through a transformer. The current transmission ground electrodes are used for sending the current waveform to an underground receiver through a drill pipe and strata to complete a ground transmitting for the electromagnetic transmission between the well and the ground for the drill guiding.

5 Claims, 10 Drawing Sheets

(58) Field of Classification Search
CPC .......... G01V 3/04; G01V 3/082; G01V 3/081; G01V 3/083; G01V 2003/084; G01V 2003/085; G01V 2003/086; G01V 3/20; G01V 3/18; G01V 3/22; G01V 3/24; G01V 3/26

See application file for complete search history.

(56) References Cited

U.S. PATENT DOCUMENTS

| | | | | |
|---|---|---|---|---|
| 2010/0155139 | A1* | 6/2010 | Kuckes | E21B 47/0228 175/45 |
| 2012/0158305 | A1* | 6/2012 | Rodney | G01V 3/26 702/6 |
| 2021/0384802 | A1* | 12/2021 | Tamura | H02K 3/28 |
| 2022/0170323 | A1 | 6/2022 | Hawkinson et al. | |
| 2022/0181935 | A1* | 6/2022 | Tamura | H02K 3/28 |

FOREIGN PATENT DOCUMENTS

| | | |
|---|---|---|
| CN | 102536204 | 7/2012 |
| CN | 102590866 | 7/2012 |
| CN | 102938616 | 2/2013 |
| CN | 103346675 | 10/2013 |
| CN | 105226987 | 1/2016 |
| CN | 106100372 | 11/2016 |
| CN | 106297223 | 1/2017 |
| CN | 10671098 | 1/2020 |
| CN | 113006777 | 6/2021 |
| RU | 2117377 | 8/1998 |

OTHER PUBLICATIONS

Lihui Cui, Complex Open-circuit Fault Detection of the IGBT in a Three-level Inverter, J. Shandong University of Sci. and tech., vol. 36, No. 4, pp. 108-114 (abstract translated).

Qi-Hui Zhen, High-frequency high-power CSAMT transmitting technology research, Chinese J. of Geophysics, 60(11):4160-4164 (2017) (abstract translated).

Retrieval report from SIPO in 202310397650.3 dated Sep. 20, 2023.

Retrieval report from SIPO in 202310397650.3 dated Nov. 10, 2023.

First Office action from SIPO in 202310397650.3 dated Sep. 22, 2023.

Notification to Grant Patent Right for Invention from SIPO in 202310397650.3 dated Nov. 16, 2023.

* cited by examiner

```
┌─────────────────────────────────────────────────────────────┐
│ Providing power supply for a ground transmitting device     │──── S1
│ through a diesel generator                                  │
└─────────────────────────────────────────────────────────────┘
                              │
                              ▼
┌─────────────────────────────────────────────────────────────┐
│ Generating a current waveform by the ground transmitting    │──── S2
│ device through the power supply                             │
└─────────────────────────────────────────────────────────────┘
                              │
                              ▼
┌─────────────────────────────────────────────────────────────┐
│ Connecting two ends of the ground transmitting device with  │
│ two ground electrodes, and transmitting the current waveform│
│ to an underground receiver through the two ground           │──── S3
│ electrodes, so as to complete a ground transmitting for     │
│ electromagnetic transmission between the well and the       │
│ ground for the drill guiding                                │
└─────────────────────────────────────────────────────────────┘
```

FIG. 3

GROUND TRANSMITTING SYSTEM AND METHOD FOR ELECTROMAGNETIC TRANSMISSION BETWEEN WELL AND GROUND FOR INTELLIGENT DRILL GUIDING

CROSS-REFERENCE TO RELATED APPLICATIONS

This application claims priority of Chinese Patent Application No. 202310397650.3, filed on Apr. 14, 2023, the entire contents of which are incorporated herein by reference.

TECHNICAL FIELD

The application belongs to the technical field of petroleum drilling, and in particular to a ground transmitting system and method for electromagnetic transmission between a well and a ground for intelligent drill guiding.

BACKGROUND

Transmission (also known as measurement while drilling) between a well and the ground realizes the transmission of underground data and of the ground drilling commands, which is very important in intelligent drill guiding system. According to the signal transmission mode, the measurement while drilling (MWD) is classified into cable MWD, central cable MWD, acoustic wave MWD, mud pulse MWD and electromagnetic MWD (EM-MWD), in which the cable MWD and the central cable MWD are wired MWD, and the acoustic wave MWD, the mud pulse MWD and the electromagnetic MWD are wireless MWD. The wired MWD affects the tripping efficiency of the drill pipe, which is easy to wear and damage, so it is not suitable for drilling engineering. The acoustic wave method uses the acoustic wave propagating along the drill pipe to transmit signals, which is not affected by drilling fluid and formation, but it attenuates quickly and has a limited transmission distance, which requires multiple repeaters and is not suitable for deep wells. Mud wave uses mud pressure waves to transmit signals. This technology is relatively mature and widely used in the drilling field, but it can't be effectively used in compressed drilling media such as air and foam, and it can't work normally in drilling leakage formation. The EM-MWD uses low-frequency electromagnetic signals to complete signal transmission through drill pipes and formation, and is not affected by drilling media. It is suitable for various drilling constructions, such as conventional drilling, lost circulation and gas drilling. Compared with the mud pulse, the EM-MWD has a simple structure and no moving parts, and has a broader application prospect. The electrode excitation mode of the derrick makes a loop between the drill pipe and the electrode formed through connecting the drilling rig (communicated with the underground) and the electrode buried several meters to several tens of meters underground through cables. In this mode, because the derrick, the drilling rig and the drill pipe are electrically connected, the ground excitation source voltage should not be too high for drilling safety, the emission power is very small, and the electromagnetic energy transmitted to the underground is small. The excitation mode of casing in adjacent wells is to place an insulation nipple at a certain position in the casing in the deep part of the adjacent well, and then connect the excitation source to the casing at both ends of the insulation nipple through cables. Although this construction mode has strong signals, it is difficult to construct and costly, which is not conducive to engineering application.

SUMMARY

In order to solve the above technical problems, the application provides a ground transmitting system and method for electromagnetic transmission between a well and a ground for intelligent drill guiding. The drilling operation platform (derrick) and the transmitting system do not need to be electrically connected, and higher power is able to be transmitted without affecting the operation safety. After transmitting higher current, stronger signals are able to be obtained at different positions of drill pipes in a deep well.

On the one hand, in order to achieve the above purpose, the application provides a ground transmitting system and method for electromagnetic transmission between a well and a ground for intelligent drill guiding, which includes a well site power generation device, a ground transmitting device and current transmission ground electrodes. The well site power generation device, the ground transmitting device and the current transmission ground electrodes are connected in sequence.

The well site power generation device is used for supplying power to the ground transmitting device.

The ground transmitting device is used for sending the generated current waveform to the current transmission ground electrodes through a transformer.

The current transmission ground electrodes are used for sending the current waveform to the underground receiver through the drill pipe and the strata to complete the ground transmitting for electromagnetic transmission between the well and the ground for the drill guiding.

Optionally, the well site power generation device includes a well site diesel generator. The well site diesel generator includes a U terminal, a V terminal and a W terminal, and the U terminal, the V terminal and the W terminal are respectively connected with the ground transmitting device.

Optionally, the ground transmitting device is respectively connected with the well site power generation device and the current transmission ground electrodes, and the ground transmitting device includes a direct current bus module, an inverter module and a control module. The direct current bus module is connected with the U terminal, the V terminal, the W terminal and the inverter module, and the inverter module is connected with the control module and the current transmission ground electrodes.

Optionally, the direct current bus module includes a first diode, a second diode, a third diode, a fourth diode, a fifth diode, a sixth diode, an inductor and a capacitor.

The cathode of the first diode is connected with the anode of the second diode and connected with the U terminal.

The cathode of the third diode is connected with the anode of the fourth diode and connected with the V terminal.

The cathode of the fifth diode is connected with the anode of the sixth diode and connected with the W terminal.

The anode of the first diode, the anode of the third diode and the anode of the fifth diode are respectively connected with the inductor.

The inductor is connected with the anode of the capacitor to form the positive pole of the direct current bus.

The cathode of the second diode, the cathode of the fourth diode and the cathode of the sixth diode are connected with the cathode of the capacitor to form the negative pole of the direct current bus.

Optionally, the inverter module includes a first insulated gate bipolar transistor, a second insulated gate bipolar transistor, a third insulated gate bipolar transistor, a fourth insulated gate bipolar transistor, a current sensor and a transformer.

The first insulated gate bipolar transistor, the second insulated gate bipolar transistor, the third insulated gate bipolar transistor and the fourth insulated gate bipolar transistor are connected and form an H-shaped inverter bridge.

The collector of the first insulated gate bipolar transistor and the collector of the third insulated gate bipolar transistor are connected with the positive pole of the direct current bus.

The emitter of the second insulated gate bipolar transistor and the emitter of the fourth insulated gate bipolar transistor are connected with the negative pole of the direct current bus.

The emitter of the first insulated gate bipolar transistor and the collector of the second insulated gate bipolar transistor are communicated and connected with one end of the primary side of the transformer.

The emitter of the third insulated gate bipolar transistor and the collector of the fourth insulated gate bipolar transistor are communicated and connected with the other end of the primary side of the transformer.

The current sensor is arranged between the two ends of the primary side of the transformer.

Two output terminals of the secondary side of the transformer are connected with the current transmission ground electrodes.

Optionally, the control module includes a waveform generator, a controller and a driver. The transmitting current obtained by the current sensor is compared with the waveform generator to form an error signal. The error signal is input into the controller to obtain four driving signals. The four driving signals form one-to-one control signals corresponding to the four insulated gate bipolar transistors through the driver and are connected to the gate control terminals of each insulated gate bipolar transistor.

Optionally, the controller includes a first comparator, a second comparator and a reset-set (RS) flip-flop. The error signal is respectively input to the negative pole of the first comparator and the positive pole of the second comparator. The positive pole of the first comparator is connected with a direct current voltage of −V, and the negative pole of the second comparator is connected with a direct current voltage of +V. The output terminal of the first comparator is connected with the reset (R) terminal of the flip-flop, and the output terminal of the second comparator is connected with the set (S) terminal of the flip-flop. The Q terminal and /Q terminal of the flip-flop output the four driving signals, and the driving signals are input into the driver to form the control signals to control the four insulated gate bipolar transistors.

On the other hand, in order to achieve the above purpose, the application also provides a ground transmitting method for electromagnetic transmission between a well and a ground for intelligent drill guiding, which includes the following steps:

S1, providing power supply for the ground transmitting device through a diesel generator;

S2, generating a current waveform by the ground transmitting device through the power supply; and S3, connecting the two ends of the ground transmitting device with two ground electrodes, and transmitting the current waveform to the underground receiver through the two ground electrodes, so as to complete the ground transmitting for electromagnetic transmission between the well and the ground for intelligent drill guiding.

The technical effect of that application are as follows: the application discloses a ground transmitting system and method for electromagnetic transmission between the well and the ground for intelligent drill guiding, which have stronger current density and stronger signal at different positions of a deep well drill pipe. According to the application, the ground transmitting system for electromagnetic transmission between the well and the ground for intelligent drill guiding is not electronically connected with the operation derrick, and is able to transmit higher power without affecting the operation safety. After transmitting higher current, stronger signals are obtained at different positions of the deep well drill pipe, and the application has obvious advantages.

BRIEF DESCRIPTION OF THE DRAWINGS

The accompanying drawings, which constitute a part of this application, are used to provide a further understanding of this application. The illustrative embodiments of this application and their descriptions are used to explain this application, and do not constitute an improper limitation of this application. In the attached drawings:

FIG. 3 is a schematic process of a ground transmitting method for electromagnetic transmission between a well and a ground for intelligent drill guiding according to an embodiment of the present application.

DETAILED DESCRIPTION OF THE EMBODIMENTS

It should be noted that the embodiments in this application and the features in the embodiments may be combined with each other without conflict. The present application will be described in detail with reference to the attached drawings and embodiments.

It should be noted that the steps shown in the flowchart of the accompanying drawings may be executed in a computer system such as a set of computer-executable instructions, and although the logical order is shown in the flowchart, in some cases, the steps shown or described may be executed in a different order from here.

Figure 1:
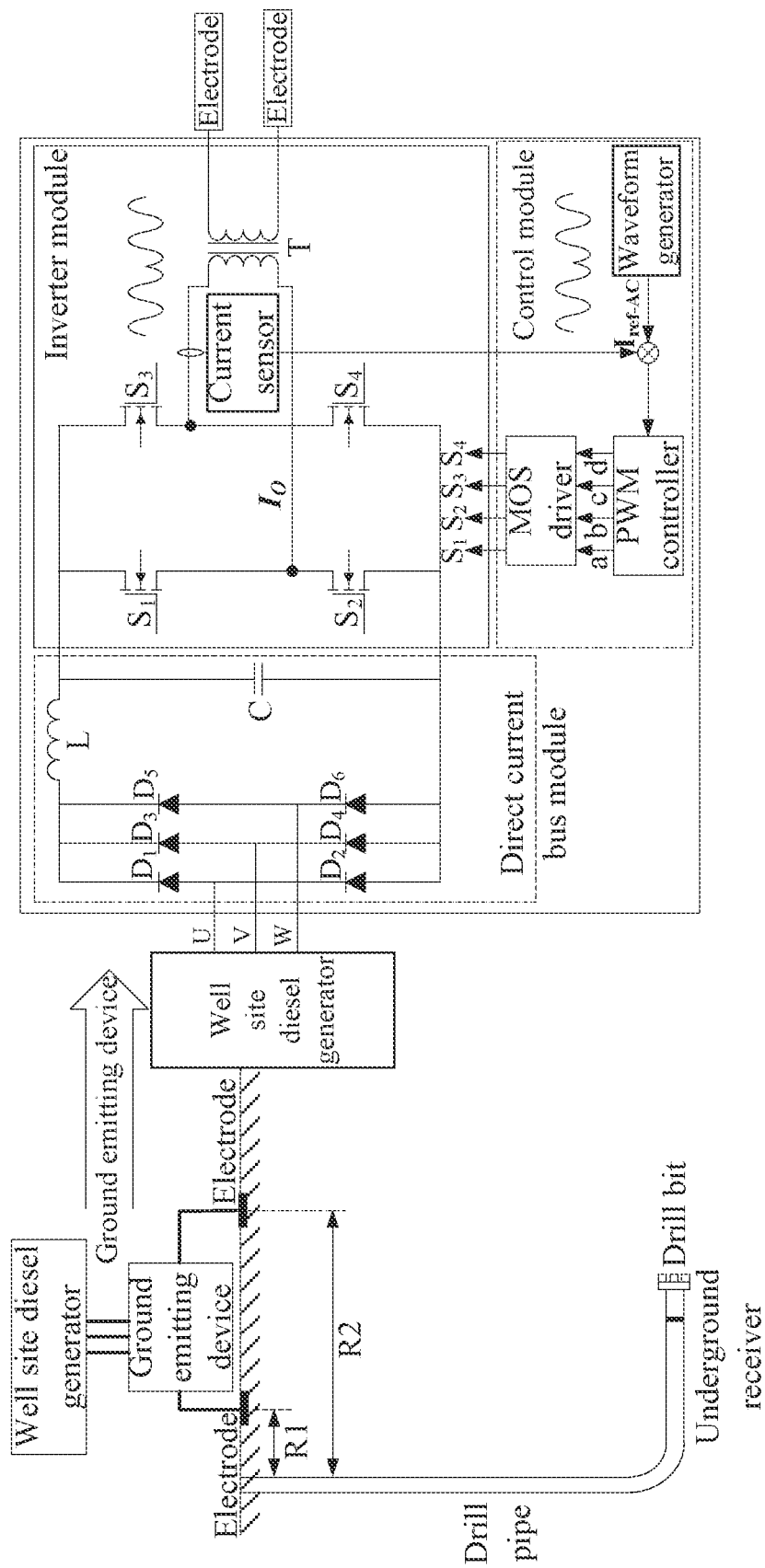
FIG. 1 is a schematic structural diagram of a ground transmitting system for electromagnetic transmission between a well and a ground for intelligent drill guiding according to an embodiment of the present application.

As shown in FIG. 1, in this embodiment, a ground transmitting system for electromagnetic transmission between a well and a ground for intelligent drill guiding includes:

a well site power generation device, a ground transmitting device and current transmission ground electrodes. The well site power generation device, the ground transmitting device and the current transmission ground electrodes are connected in sequence. The well site power generation device is used for supplying power to the ground transmitting device. The ground transmitting device is used for transmitting the generated current waveform to the current transmission ground electrodes through the transformer. The current transmission ground electrodes are used to send the current waveform to the underground receiver through the drill pipe and the strata to complete the ground transmitting for electromagnetic transmission between the well and the ground for intelligent drill guiding.

In an embodiment, the well site power generation device includes a well site diesel generator. The well site diesel generator includes a U terminal, a V terminal and a W terminal, and the U terminal, the V terminal and the W terminal are respectively connected with the ground transmitting device. The ground transmitting device is respectively connected with the well site power generation device and the current transmission ground electrodes, and the ground transmitting device includes a direct current bus module, an inverter module and a control module. The direct current bus module is connected with the U terminal, the V terminal, the W terminal and the inverter module, and the inverter module is connected with the control module and the transformer. The transformer is connected with the current transmission ground electrodes.

In an embodiment, the direct current bus module includes a first diode, a second diode, a third diode, a fourth diode, a fifth diode, a sixth diode, an inductor and a capacitor. The cathode of the first diode is connected with the anode of the second diode and connected with the U terminal. The cathode of the third diode is connected with the anode of the fourth diode and connected with the V terminal. The cathode of the fifth diode is connected with the anode of the sixth diode and connected with the W terminal. The anode of the first diode, the anode of the third diode and the anode of the fifth diode are respectively connected with the inductor. The inductor is connected with the anode of the capacitor to form the positive pole of the direct current bus. The cathode of the second diode, the cathode of the fourth diode and the cathode of the sixth diode are connected with the cathode of the capacitor to form the negative pole of the direct current bus. Specifically, the cathode of the diode D1 is connected with the anode of the diode D2 and connected with the output U terminal of the well site diesel generator. The cathode of the diode D3 is connected with the anode of the diode D4 and connected with the output V terminal of the well site diesel generator. The cathode of the diode D5 is connected with the anode of the diode D6 and connected with the output W terminal of the well site diesel generator. The anodes of diodes D1, D3 and D5 are connected together and connected with the inductor L, and the other end of the inductor is connected with the anode of capacitor C to form the positive pole of the direct current bus. The cathode s of diodes D2, D4 and D6 are connected together and connected to the cathode of capacitor C to form the negative pole of the direct current bus.

In an embodiment, the inverter module includes a first insulated gate bipolar transistor, a second insulated gate bipolar transistor, a third insulated gate bipolar transistor, a fourth insulated gate bipolar transistor, a current sensor and a transformer. The first insulated gate bipolar transistor, the second insulated gate bipolar transistor, the third insulated gate bipolar transistor and the fourth insulated gate bipolar transistor are connected and form an H-shaped inverter bridge. The collector of the first insulated gate bipolar transistor and the collector of the third insulated gate bipolar transistor are connected with the positive pole of the direct current bus. The emitter of the second insulated gate bipolar transistor and the emitter of the fourth insulated gate bipolar transistor are connected with the negative pole of the direct current bus. The emitter of the first insulated gate bipolar transistor and the collector of the second insulated gate bipolar transistor are communicated and connected with one end of the primary side of the transformer. The emitter of the third insulated gate bipolar transistor and the collector of the fourth insulated gate bipolar transistor are communicated and connected with the other end of the primary side of the transformer. The current sensor is arranged between the two ends of the primary side of the transformer. Two output terminals of the secondary side of the transformer are connected with the current transmission ground electrodes. Specifically, four insulated gate bipolar transistors (IGBT) S1, S2, S3, S4 form an H-shaped inverter bridge. The collectors of S1 and S3 are connected to the positive pole of the direct current bus, and the emitter of S2 and S4 are connected to the negative pole of the direct current bus. Emitter of S1 and collector of S2 are connected to one end of the primary side of transformer T. Emitter of S3 and collector of S4 are connected to the other end of the primary side of transformer T. Two output terminals of the secondary side of the transformer are respectively connected to the current transmission ground electrodes.

Figure 2:
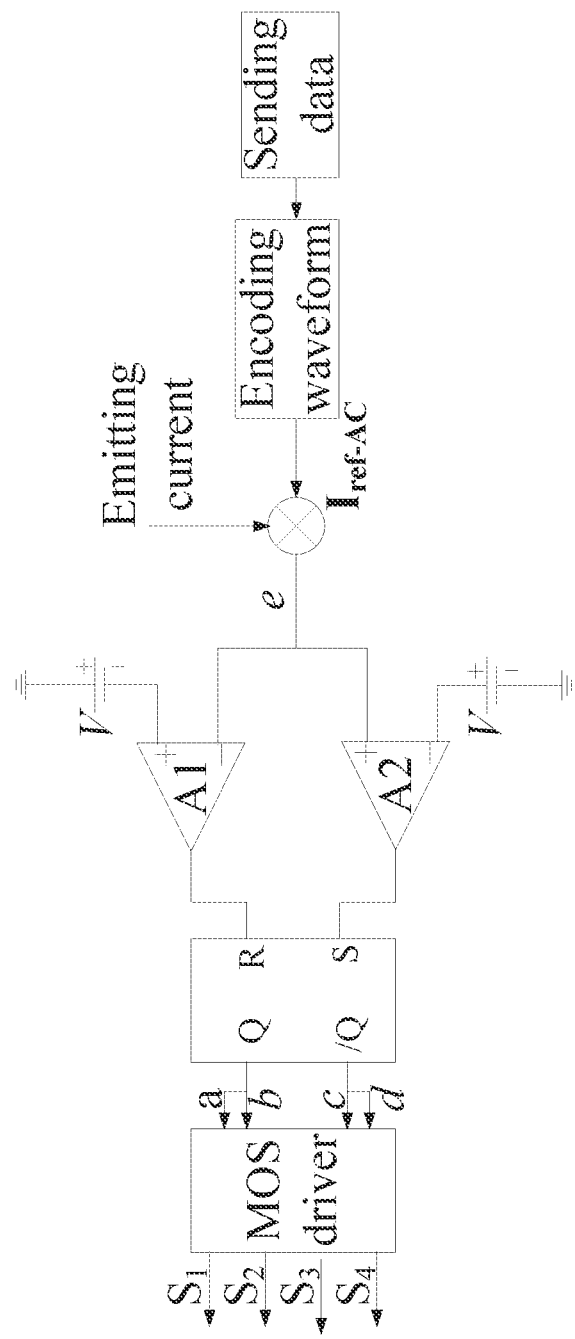
FIG. 2 is a schematic diagram of an internal structure of a controller according to the embodiment of the present application.

In an embodiment, the control module includes a waveform generator, a controller and a driver. The transmitting current obtained by the current sensor is compared with the waveform generator to form an error signal. The error signal is input into the controller to obtain four driving signals. The four driving signals form one-to-one control signals corresponding to the four insulated gate bipolar transistors through the driver and are connected to the gate control terminals of each of the insulated gate bipolar transistors. The controller includes a first comparator, a second comparator and a reset-set (RS) flip-flop. The error signal is respectively input to the negative pole of the first comparator and the positive pole of the second comparator. The positive pole of the first comparator is connected with a direct current voltage of $-V$, and the negative pole of the second comparator is connected with a direct current voltage of $+V$. The output terminal of the first comparator is connected with the reset (R) terminal of the flip-flop, and the output terminal of the second comparator is connected with the set (S) terminal of the flip-flop. The Q terminal and/Q terminal of the flip-flop output the four driving signals, and the driving signals are input into the driver to form the control signals to control the four insulated gate bipolar transistors. The transmitting current of the primary side of the transformer is obtained by the current sensor, and the transmitting current is compared with the waveform generator to form an error signal e. After the error signal is sent to the pulse width modulator (PWM) controller, four driving signals abcd are generated, and the driving signals abcd form control signals of S1, S2, S3 and S4 through a Metal oxide semiconductor (MOS) driver and are respectively connected to the gate control terminals of S1, S2, S3 and S4. The internal structure of the PWM controller is shown in FIG. 2, which encodes the transmitted data into a current waveform Iref-AC to be transmitted, and subtracts the encoded waveform from the transmitting current to obtain an error signal e. The error signal e is sent to the negative polarity terminal of comparator A1 and the positive polarity terminal of comparator A2 respectively. The positive polarity terminal of A1 is connected to direct current voltage −V, and the negative polarity terminal of A2 is connected to direct current voltage +V. V is set as 0.1 indicating that the output current error is within ±0.1 A. The output of comparator A1 is connected to the R terminal of RS flip-flop, and the output of comparator A2 is connected to the S terminal of RS flip-flop. The output Q of the RS flip-flop forms the signal ab, and the output/Q of the RS flip-flop forms the signal cd. The signals abcd form the gate driving signals of the four insulated gate bipolar transistors S1, S2, S3, and S4 constituting the inverter bridge through MOS driver. Because the transmitting system is output to the electrodes through the transformer, the transmitting system is electrically isolated from the diesel generator. In addition, the transmitter and the drilling rig are completely safely isolated under the action of the insulating collar of the sleeve, which realizes high-power transmission above 1 kW. The transmitter of the application adopts the well site diesel generator, so there is no problem of system power supply, and the highest voltage of the output transformer is 1000V, which realizes high-power transmission of more than 20 kW and is much larger than the transmission power of the existing transmitting system of only 3-5W, ensuring that the underground receiver is able to obtain strong enough ground downlink signals. Because the transmitting device is electrically isolated from the well site equipment through the transformer output, the construction is safer.

As shown in FIG. 3, a ground emission method for electromagnetic transmission of an intelligent pilot well is also provide by this application, which includes the following steps:

S1, providing power supply for the ground transmitting device through a diesel generator;

S2, generating a current waveform by the ground transmitting device through the power supply; and S3, connecting the two ends of the ground transmitting device with two ground electrodes, and transmitting the current waveform to the underground receiver through the two ground electrodes, so as to complete the ground transmitting for electromagnetic transmission between the well and the ground for intelligent drill guiding.

Figure 4:
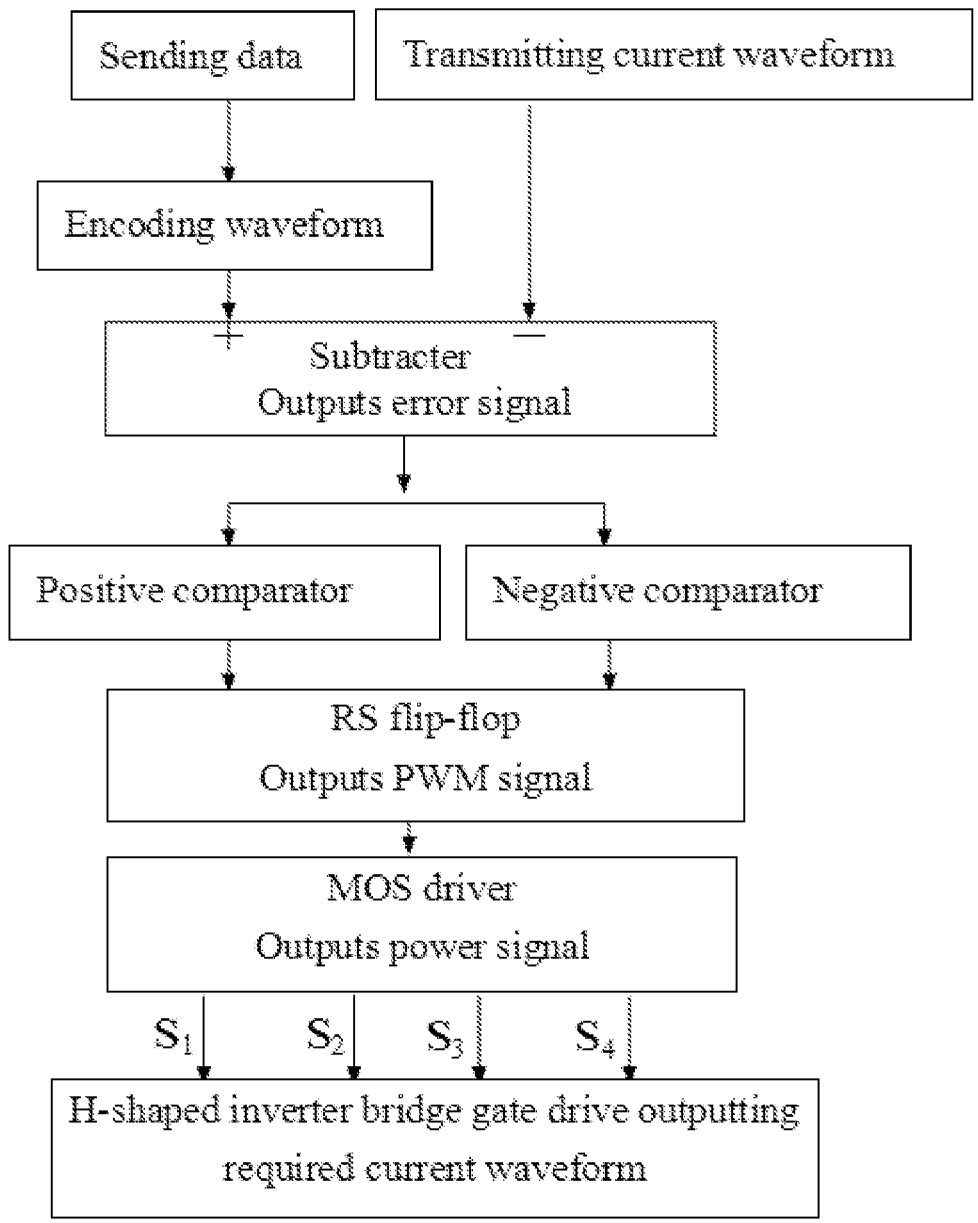
FIG. 4 is a flow chart of transmitting signals according to an embodiment of the present application.

As shown in FIG. 4, after the transmitter determines the data information to be transmitted, it encodes the data to form the required waveform Iref-AC of transmitting current. An error signal e is obtained by subtracting the coded waveform from the transmitting current. The error signal e is sent to the negative polarity terminal of comparator A1 and the positive polarity terminal of comparator A2 respectively. The positive polarity terminal of A1 is connected with direct current voltage −V, and the negative polarity terminal of A2 is connected with direct current voltage +V. V is set as 0.1 indicating that the output current error is within ±0.1 A. The output of comparator A1 is connected to the R terminal of RS flip-flop, and the output of comparator A2 is connected to the S terminal of RS flip-flop. The output Q of the RS flip-flop forms the signal ab, and the output/Q of the RS flip-flop forms the signal cd. After passing through the MOS driver, the signal abcd forms the gate driving signals of the four insulated gate bipolar transistors S1, S2, S3, and S4 which form the inverter bridge.

A comparative experiment with the traditional transmitting method is carry out in the same geological environment, as shown in FIG. 5-FIG. 10.

Figure 5:
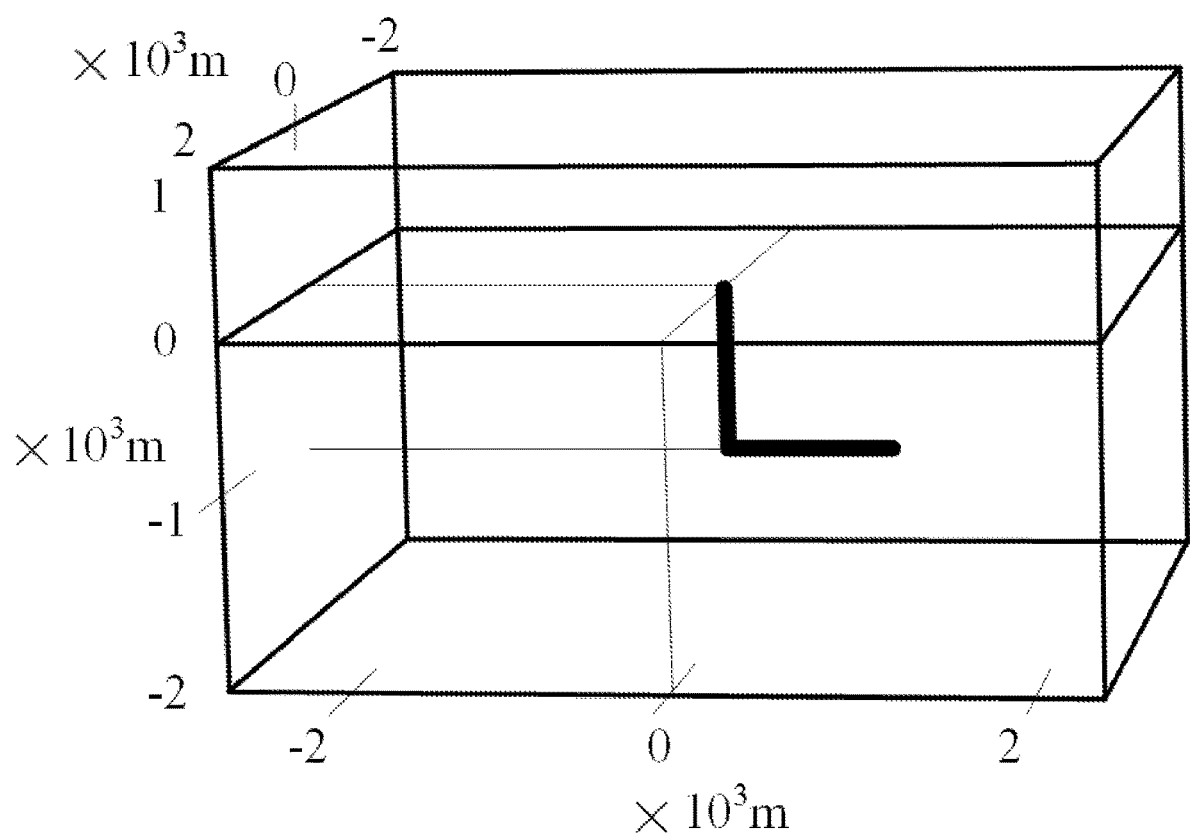
FIG. 5 is a schematic diagram of a calculation model design according to an embodiment of the present application.
Figure 6:
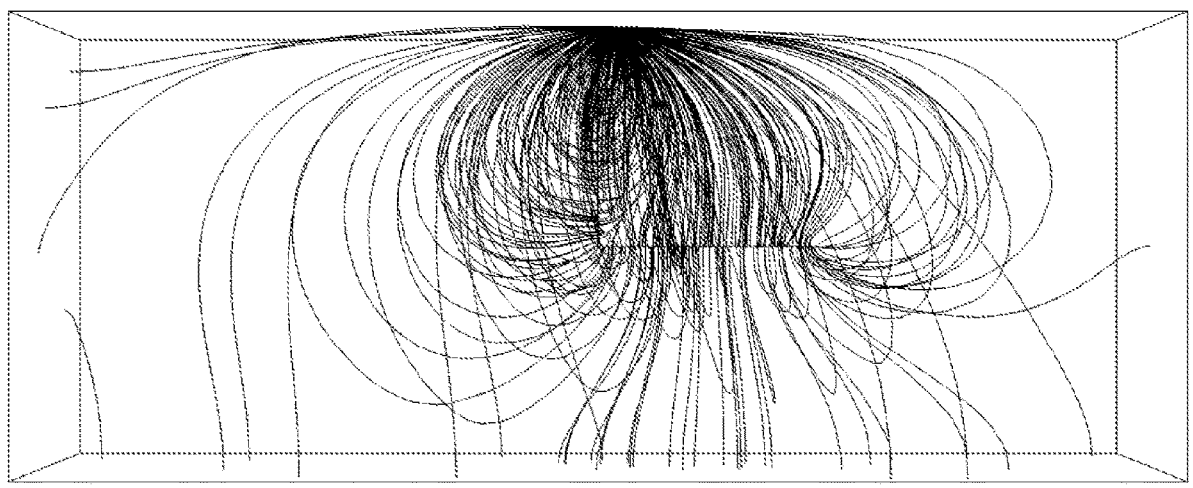
FIG. 6 is a schematic diagram of a current spatial distribution in a derrick electrode mode according to the embodiment of the present application.
Figure 7:
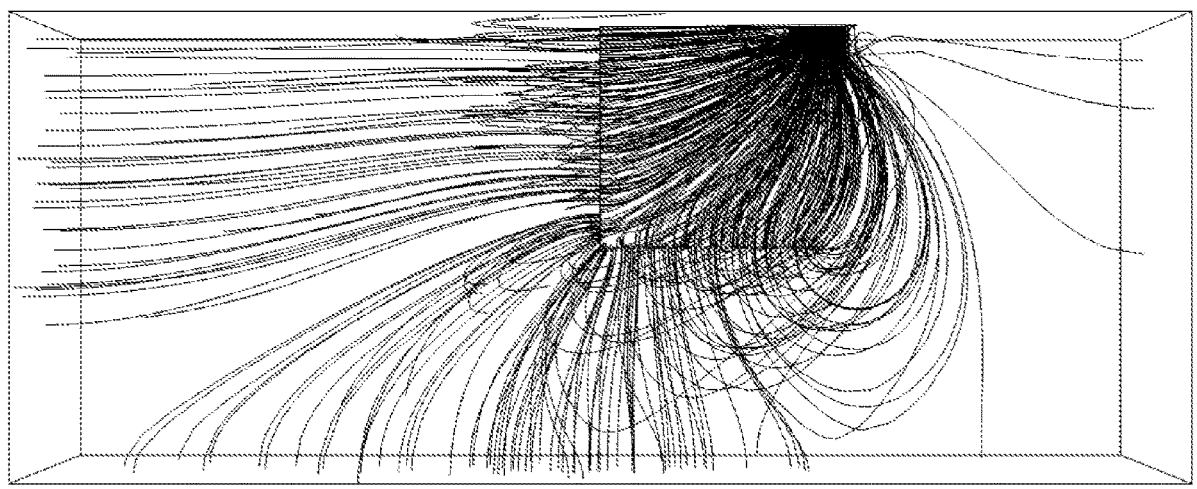
FIG. 7 is a schematic diagram of a current spatial distribution in this application mode according to the embodiment of the present application.
Figure 8:
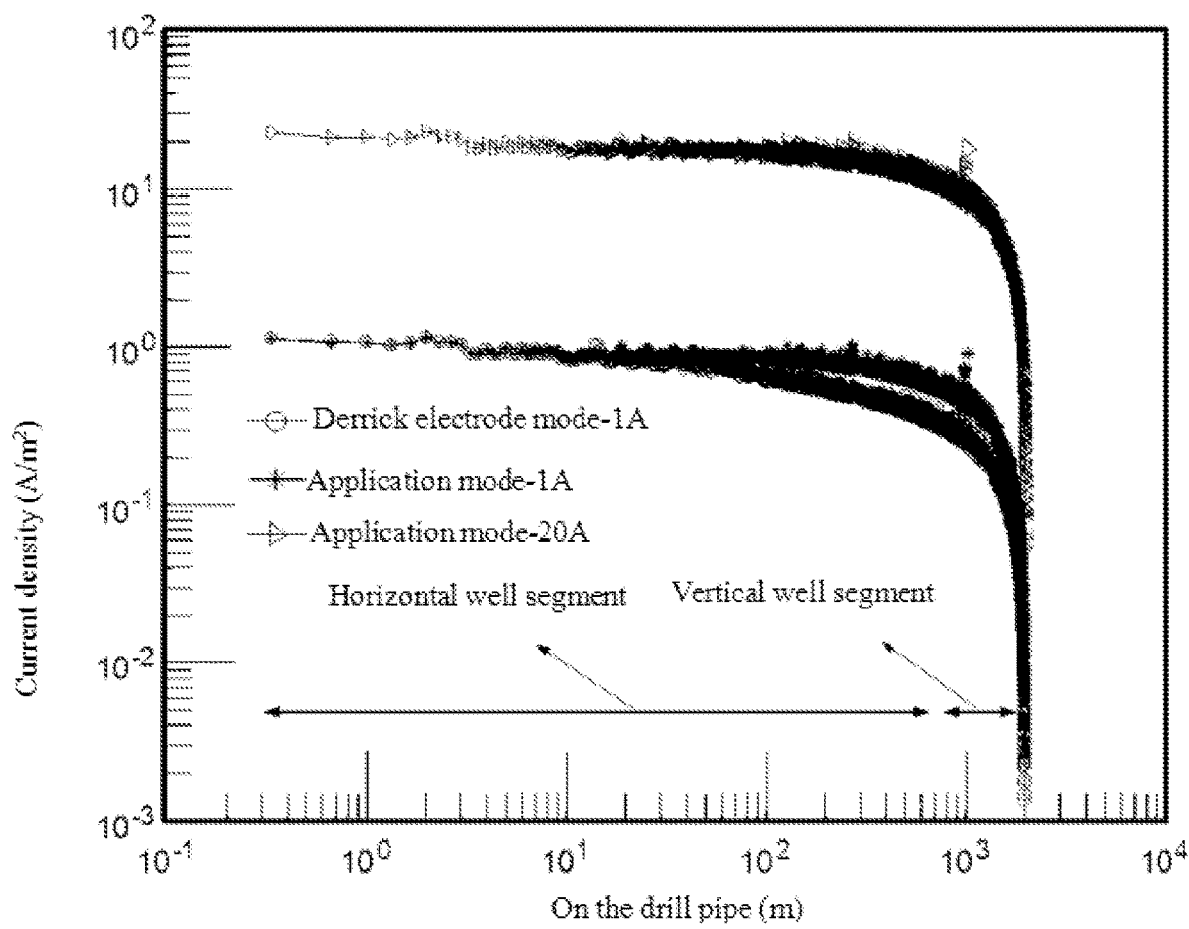
FIG. 8 is a diagram showing a current density distribution on a drill pipe in this application mode in the embodiment of the present application and in a traditional mode.
Figure 9:
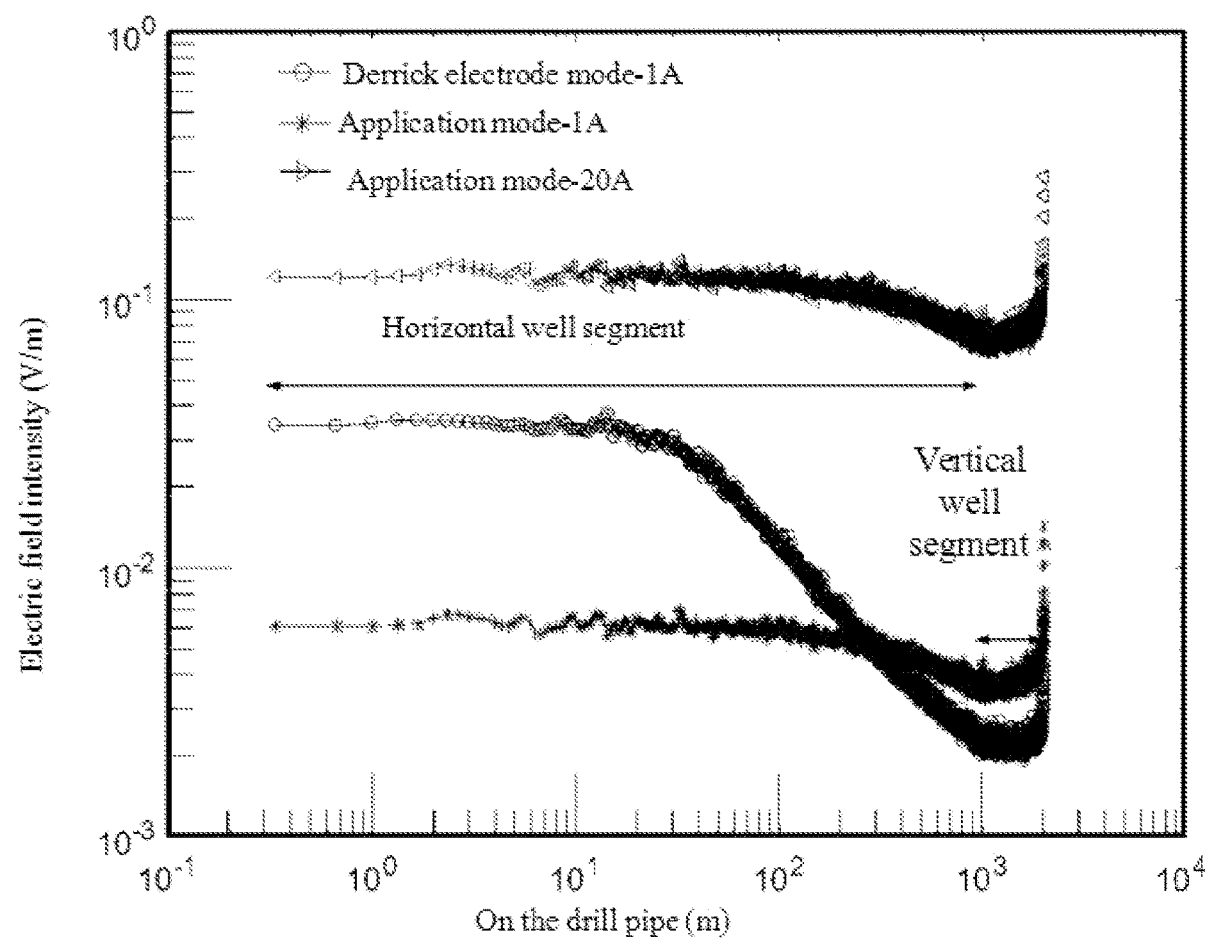
FIG. 9 is a distribution diagram of electric field intensity on a drill pipe in this application mode in the embodiment of the present application and in the traditional mode.
Figure 10:
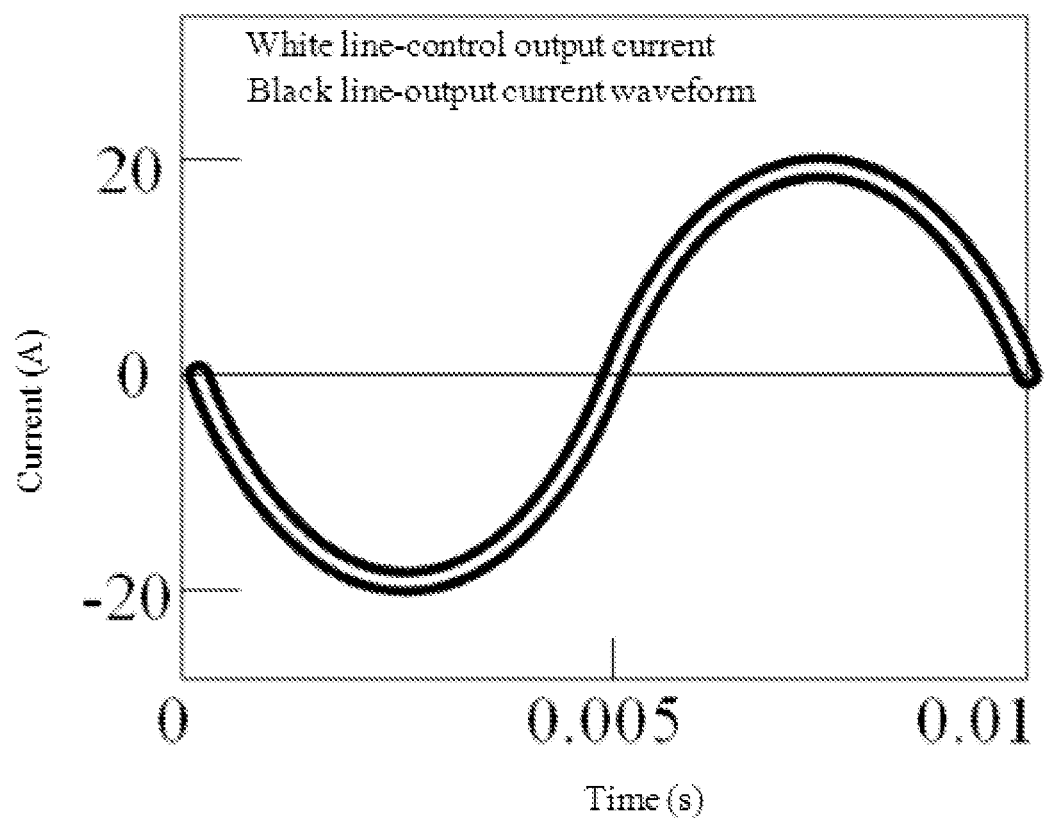
FIG. 10 shows implementation effect of a control current waveform and an output current waveform according to the embodiment of the present application.

The underground received signal amplitude is V=J·S·d·ρ, where J is the current density at the position where the drill pipe is installed with the receiving electrode, S is the cross-sectional area of the drill pipe, d is the insulation nipple length of the receiving electrode, usually less than 0.5 m, and ρ is the average resistivity at both ends of the electrodes, which is influenced by drilling fluid and strata resistivity, etc. Therefore, under the same drilling conditions, the intensity of the received signal is directly proportional to the current density at the receiving position, and then directly proportional to the electric field intensity at the receiving position. The simulation calculation model is designed 5 km long and 5 km wide, 1 km high in the air layer and 2 km deep in the strata. The resistivity of the air is $3\times10^{13}\Omega\cdot m$ and the resistivity of the strata is $1000\Omega\cdot m$. The wellhead is at the origin coordinates (0,0,0), the vertical well segment is 1 km deep and the horizontal well segment is 1 km, as shown in FIG. 5. Firstly, the traditional mode of derrick electrode is calculated, in which one of output ports of the transmitter is connected to the wellhead and the other output port of the transmitter is connected to the electrodes 50 m away from the wellhead. The transmitting current is 1 A and the frequency is 10 Hz. The spatial distribution of the current is shown in FIG. 6. It can be seen that most of the current is concentrated near the wellhead, and the current in the deep part is reduced. Then, according to the traditional mode of the application as shown in FIG. 1, one end of the transmitting is connected to the ground electrode 1 m away from the wellhead, and the other end is connected to the ground electrode 1 km away. The transmitting currents are 1 A and 20 A, respectively, and the frequency is 10 Hz. The spatial distribution of the current is shown in FIG. 7. Compared with the traditional mode, the current density of the technology of the application is stronger in the deep part, and most of the current flows back from the deep drill pipe except a part from the shallow part, so under the same transmitting current condition, the technology of the application has obvious effect in increasing the signal intensity in the deep part. In order to give the above conclusion more intuitively, the electric field distribution along the drill pipe position in the two modes is analyzed respectively. Under the traditional mode and the excitation mode of the present application, the current density distribution along the drill pipe is shown in FIG. 8, and the electric field intensity distribution along the drill pipe is shown in FIG. 9. It can be seen that under the condition of simultaneous transmitting 1A, the current density distribution on the drill pipe with a depth of less than 100 m is almost the same, but with the deepening of the depth, current density in the traditional derrick electrode mode drops rapidly, while the current density and electric field intensity for the mode of the present application only drop slightly, and the current density and electric field intensity are gradually larger than the current density and electric field intensity of the derrick electrode mode, which has obvious advantages. In addition, because the transmission power of the mode of the present application is obtained from the well site diesel generator, the transmission power is able to reach more than 20 kW, while the transmission power of the derrick electrode mode is usually only a few W. After the transmitting current of the mode of the present application is increased to 20A, the signal strength is greatly improved. Assuming that the direct current bus voltage is 500V, the transmitting current waveform is sine wave with amplitude of 20A and frequency of 100 Hz, then the control output waveform is shown in FIG. 10. It can be seen from the FIG. 10 that the output current waveform basically follows the shape of the control current waveform, achieving the control purpose.

The above is only the preferred embodiment of this application, but the protection scope of this application is not limited to this. Any change or replacement that may be easily thought of by a person familiar with this technical field within the technical scope disclosed in this application should be included in the protection scope of this application. Therefore, the protection scope of this application should be based on the protection scope of the claims.

What is claimed is:

1. A ground transmitting system for electromagnetic transmission between a well and a ground for intelligent drill guiding, comprising:
    a well site power generation device, a ground transmitting device and current transmission ground electrodes, wherein the well site power generation device, the ground transmitting device and the current transmission ground electrodes are connected in sequence;
    the well site power generation device is used for supplying power to the ground transmitting device; wherein the well site power generation device comprises a well site diesel generator, the well site diesel generator comprises a first output terminal, a second output terminal and a third output terminal, and the first output terminal, the second output terminal and the third output terminal are respectively connected with the ground transmitting device;
    the ground transmitting device is used for sending generated current waveform to the current transmission ground electrodes through a transformer; wherein the ground transmitting device is respectively connected with the well site power generation device and the current transmission ground electrodes, and the ground transmitting device comprises a direct current bus module, an inverter module and a control module, the direct current bus module is connected with the first output terminal, the second output terminal, the third output terminal and the inverter module, and the inverter module is connected with the control module and the current transmission ground electrodes; wherein the control module comprises a waveform generator, a controller and a driver; the inverter module comprises a first insulated gate bipolar transistor, a second insulated gate bipolar transistor, a third insulated gate bipolar transistor, a fourth insulated gate bipolar transistor, a current sensor and a transformer;
    an transmitting current obtained by the current sensor in the inverter module is compared with the waveform generator to form an error signal, the error signal is input into the controller to obtain four driving signals, the four driving signals form one-to-one control signals corresponding to four insulated gate bipolar transistors through the driver and are connected to gate control terminals of each of the insulated gate bipolar transistors; and
    the current transmission ground electrodes are used for sending the current waveform to an underground receiver through a drill pipe and strata to complete a ground transmitting for the electromagnetic transmission between the well and the ground for the drill guiding.

2. The ground transmitting system for electromagnetic transmission between the well and the ground for intelligent drill guiding according to claim 1,
    wherein the direct current bus module comprises a first diode, a second diode, a third diode, a fourth diode, a fifth diode, a sixth diode, an inductor and a capacitor;
    a cathode of the first diode is connected with an anode of the second diode and connected with the first output terminal;
    a cathode of the third diode is connected with an anode of the fourth diode and connected with the second output terminal;
    a cathode of the fifth diode is connected with an anode of the sixth diode and connected with the third output terminal;
    an anode of the first diode, an anode of the third diode and an anode of the fifth diode are respectively connected with the inductor;
    the inductor is connected with an anode of the capacitor to form a positive pole of a direct current bus; and
    a cathode of the second diode, a cathode of the fourth diode and a cathode of the sixth diode are connected with a cathode of the capacitor to form a negative pole of the direct current bus.

3. The ground transmitting system for electromagnetic transmission between the well and the ground for intelligent drill guiding according to claim 1, wherein
    the first insulated gate bipolar transistor, the second insulated gate bipolar transistor, the third insulated gate bipolar transistor and the fourth insulated gate bipolar transistor are connected and form an H-shaped inverter bridge;
    a collector of the first insulated gate bipolar transistor and a collector of the third insulated gate bipolar transistor are connected with the positive pole of the direct current bus;
    an emitter of the second insulated gate bipolar transistor and an emitter of the fourth insulated gate bipolar transistor are connected with the negative pole of the direct current bus;
    an emitter of the first insulated gate bipolar transistor and a collector of the second insulated gate bipolar transistor are communicated and connected with one end of a primary side of the transformer;
    an emitter of the third insulated gate bipolar transistor and a collector of the fourth insulated gate bipolar transistor are communicated and connected with an other end of the primary side of the transformer;
    the current sensor is arranged between two ends of the primary side of the transformer; and
    two output terminals of a secondary side of the transformer are connected with the current transmission ground electrodes.

4. The ground transmitting system for electromagnetic transmission between the well and the ground for intelligent drill guiding according to claim 1, wherein
    the controller internally comprises a first comparator, a second comparator and an RS flip-flop, the error signal is respectively input to a negative pole of the first comparator and a positive pole of the second comparator, a positive pole of the first comparator is connected with a direct current voltage of −V, and a negative pole of the second comparator is connected with a direct current voltage of +V, an output terminal of the first comparator is connected with an R terminal of the flip-flop, and an output terminal of the second comparator is connected with an S terminal of the flip-flop, a Q terminal and a/Q terminal of the flip-flop output the four driving signals, and the driving signals are input into the driver to form the control signals to control the four insulated gate bipolar transistors.

5. A ground transmitting method for electromagnetic transmission between a well and a ground for intelligent drill guiding; wherein the ground transmitting method is performed by the ground transmitting system for electromagnetic transmission between the well and the ground for intelligent drill guiding according to claim 1, wherein the ground transmitting method comprises following steps:

provating power supply for a ground transmitting device through a diesel generator;

generating a current waveform by the ground transmitting device through the power supply; and connecting two ends of the ground transmitting device with two ground electrodes, and transmitting the current waveform to an underground receiver through the two ground electrodes, so as to complete a ground transmitting for the electromagnetic transmission between the well and the ground for the drill guiding.

\* \* \* \* \*